United States Patent
Chen et al.

(10) Patent No.: US 9,349,162 B1
(45) Date of Patent: May 24, 2016

(54) SYSTEM AND METHOD FOR IMAGE COLOR CORRECTION

(71) Applicant: MATROX ELECTRONIC SYSTEMS LTD., Dorval (CA)

(72) Inventors: Shaohua Chen, Ste-Catherine (CA); Steve Massicotte, Montreal (CA)

(73) Assignee: MATROX ELECTRONIC SYSTEMS LTD., Dorval, QC (CA)

( * ) Notice: Subject to any disclaimer, the term of this patent is extended or adjusted under 35 U.S.C. 154(b) by 0 days.

(21) Appl. No.: 14/720,308

(22) Filed: May 22, 2015

Related U.S. Application Data

(60) Provisional application No. 62/068,533, filed on Oct. 24, 2014.

(51) Int. Cl.
| | |
|---|---|
| *G06K 9/00* | (2006.01) |
| *G06T 5/00* | (2006.01) |
| *G06T 5/40* | (2006.01) |
| *G06T 7/40* | (2006.01) |
| *H04N 9/64* | (2006.01) |

(52) U.S. Cl.
CPC . *G06T 5/001* (2013.01); *G06T 5/40* (2013.01); *G06T 7/408* (2013.01); *H04N 9/646* (2013.01); *G06T 2207/10024* (2013.01); *G06T 2207/20072* (2013.01); *G06T 2207/20182* (2013.01)

(58) Field of Classification Search
USPC ......... 382/167, 162, 165, 173, 128, 131, 132, 382/154; 1/1; 345/589; 348/409.1, E17
See application file for complete search history.

(56) References Cited

U.S. PATENT DOCUMENTS

| | | | |
|---|---|---|---|
| 5,347,374 | A | 9/1994 | Fuss et al. |
| 5,828,793 | A | 10/1998 | Mann |
| 6,456,339 | B1 | 9/2002 | Surati et al. |
| 6,594,388 | B1 | 7/2003 | Gindele et al. |
| 7,259,784 | B2 | 8/2007 | Cutler |
| 7,289,667 | B2 | 10/2007 | Nenonen et al. |

(Continued)

FOREIGN PATENT DOCUMENTS

| | | | |
|---|---|---|---|
| EP | 709806 | * 5/1996 | ............... G06T 5/40 |
| EP | 1648158 | 4/2006 | |
| WO | WO2014056679 | 4/2014 | |

OTHER PUBLICATIONS

Elgayar et al., "Two-level topoligical mapping and localization based on SIFT and The Wavelet Transform", Recent Advances in Telecommunications and Circuits, 2012, pp. 155-160.

(Continued)

*Primary Examiner* — Anh Do

(57) ABSTRACT

A reference value for a color statistic and an input image sample are received. A global color mapping is performed between the input image sample and the reference value to obtain a globally-mapped input image sample, the color statistic of the globally-mapped input image sample substantially matching the reference value and each pixel location in the globally-mapped input image sample having a correspondence with a corresponding pixel location in the input image sample. A point-to-point color mapping function minimizing for all pixels an error between the globally-mapped input image sample and the input image sample mapped according to the color mapping function is computed, the color mapping function transforming a color value of each pixel location in the input image sample to substantially match a color value of the corresponding pixel location in the globally-mapped input image sample.

30 Claims, 15 Drawing Sheets

(56) References Cited

U.S. PATENT DOCUMENTS

| | | | |
|---|---|---|---|
| 7,352,895 B2* | 4/2008 | Speigle | H04N 1/6086 345/589 |
| 7,613,335 B2* | 11/2009 | McLennan | G06K 9/4652 382/128 |
| 7,684,096 B2 | 3/2010 | Gonsalves | |
| 7,974,465 B2 | 7/2011 | Kim | |
| 8,165,395 B2 | 4/2012 | Liu et al. | |
| 8,340,423 B1* | 12/2012 | Zelinka | G06T 3/4038 382/173 |
| 8,379,971 B2 | 2/2013 | Muijs et al. | |
| 8,515,171 B2 | 8/2013 | Vantaram et al. | |
| 8,711,248 B2 | 4/2014 | Jandhyala et al. | |
| 8,768,046 B2 | 7/2014 | Ernst et al. | |
| 9,186,909 B1* | 11/2015 | Paliy | B41H 2/473 |
| 2003/0156299 A1 | 8/2003 | Martinez et al. | |
| 2009/0153745 A1 | 6/2009 | Park et al. | |
| 2013/0051668 A1 | 2/2013 | Finlayson | |

OTHER PUBLICATIONS

Reinhard et al., "Color Transfer between images", Computer Graphics and Applications, IEEE vol. 21, Issue 5, Sep. 2001. pp. 34-41.

Grundland et al., "Color Histogram Specification by Histogram Warping", Proceedings of the SPIE, vol. 5667, 2005, pp. 610-621.

Yilmaz et al., "Color Calibration of Scanners using Polynomial Transformation", XXth ISPRS Congress: Proceedings of Commission V, Istanbul, Turkey, 2004, pp. 890-895.

Tikhonov, "On the Stability of Inverse Problems", Doklady Akademii Nauk SSSR, vol. 39, No. 5, 1943, pp. 195-198.

* cited by examiner

SYSTEM AND METHOD FOR IMAGE COLOR CORRECTION

CROSS-REFERENCE TO RELATED APPLICATIONS

This patent application claims priority under 35 USC §119 (e) of U.S. provisional Application Ser. No. 62/068,533, filed on Oct. 24, 2014, the contents of which are hereby incorporated by reference.

TECHNICAL FIELD

The present invention relates to image color correction.

BACKGROUND OF THE ART

In color machine vision, computer vision, and image processing applications, image colors are typically vulnerable to image acquisition conditions. This affects the performance of color-based applications, such as color matching and segmentation. In order to improve the performance of color-based applications, it is therefore desirable to minimize the influence of image acquisition conditions. This can be achieved by applying a color correction method to each input image prior to any color-based application on the input images.

Color correction methods generally correct the colors of an input image with respect to those of a reference image. Known color correction methods can be grouped into two categories, referred to herein as "global" and "point-to-point" color mapping methods. Global color mapping methods employ the statistics of the colors of the input image and reference image. Point-to-point color mapping methods employ the colors of corresponding pixels in the input image and reference image. Generally, point-to-point color mapping methods aim to find a color mapping function that when applied to the color values of pixels in the input image returns the color values of the corresponding pixels in the reference image. Examples of global color mapping methods include Mean Approximation (MA), Mean-Variance Approximation (MVA), and Histogram Specification (HS). The MA technique adjusts the color values of each input image such that the mean (or average) of each input image matches the mean of the reference image. The MVA technique adjusts the color values of each input image such that the mean and the variance (or standard deviation) of each input image matches those of the reference image. The HS technique transforms the color values of each input image such that the color histogram of each input image matches the color histogram of the reference image.

Point-to-point color mapping techniques can be implemented "automatically". That is, a single color mapping function can be calculated between an input image sample and the reference image, and this color mapping function can then be applied directly to all of the input images at runtime. In addition, point-to-point color mapping techniques typically achieve more accurate results than global color mapping techniques. However, point-to-point techniques require "pixel correspondence" between the input image sample and the reference image. That is, point-to-point techniques require an input image sample and reference image whose contents are perfectly aligned (which is not always possible in practice) or require that pairs of corresponding pixels in the input image sample and reference image be provided by another means (e.g., entered by a user).

Global color mapping techniques do not require pixel correspondence and are therefore more flexible than point-to-point techniques. However, global color mapping techniques typically achieve less accurate results than point-to-point techniques. For example, some global color mapping techniques, such as MA and MVA, can correct only certain types of color distortion. Other global color mapping techniques, such as HS, are more versatile than MA and MVA, but can introduce color artifacts (i.e. false colors). Also, global color mapping techniques cannot always be implemented automatically. Indeed, with HS, it is generally not possible to find a single color mapping function that can be applied directly to all input images. The histogram matching process must therefore be repeated for each new input image, which is time-consuming and impractical for real time applications.

There is therefore a need for an improved image color correction technique.

SUMMARY

In accordance with a first broad aspect, there is provided a method for image color correction. The method comprises receiving at least one reference value for at least one color statistic, receiving an input image sample, performing a global color mapping between the input image sample and the at least one reference value to obtain a globally-mapped input image sample, the at least one color statistic of the globally-mapped input image sample substantially matching the at least one reference value and each pixel location in the globally-mapped input image sample having a correspondence with a corresponding pixel location in the input image sample, and computing a point-to-point color mapping function minimizing for all pixels an error between the globally-mapped input image sample and the input image sample mapped according to the color mapping function, the color mapping function transforming at least one color value of each pixel location in the input image sample to substantially match at least one color value of the corresponding pixel location in the globally-mapped input image sample.

In accordance with another broad aspect, there is provided a method for image color correction. The method comprises receiving a reference color histogram, receiving an input image sample, performing a global color mapping between the input image sample and the reference color histogram to obtain a globally-mapped input image sample, a color histogram of the globally-mapped input image sample substantially matching the reference color histogram and each pixel location in the globally-mapped input image sample having a correspondence with a corresponding pixel location in the input image sample, and applying a Pseudo Inverse technique to compute a point-to-point color mapping function minimizing for all pixels a square error between the globally-mapped input image sample and the input image sample mapped according to the color mapping function, the color mapping function transforming at least one color value of each pixel location in the input image sample to substantially match at least one color value of the corresponding pixel location in the globally-mapped input image sample.

In accordance with yet another broad aspect, there is provided a system for image color correction. The system comprises a memory, a processor, and at least one application stored in the memory. The at least one application is executable by the processor for receiving at least one reference value for at least one color statistic, receiving an input image sample, performing a global color mapping between the input image sample and the at least one reference value to obtain a globally-mapped input image sample, the at least one color statistic of the globally-mapped input image sample substantially matching the at least one reference value and each pixel location in the globally-mapped input image sample having a correspondence with a corresponding pixel location in the input image sample, and computing a point-to-point color mapping function minimizing for all pixels an error between the globally-mapped input image sample and the input image sample mapped according to the color mapping function, the color mapping function transforming at least one color value of each pixel location in the input image sample to substantially match at least one color value of the corresponding pixel location in the globally-mapped input image sample.

In accordance with yet another broad aspect, there is provided a computer readable medium having stored thereon program code executable by a processor for image color correction. The program code is executable for receiving at least one reference value for at least one color statistic, receiving an input image sample, performing a global color mapping between the input image sample and the at least one reference value to obtain a globally-mapped input image sample, the at least one color statistic of the globally-mapped input image sample substantially matching the at least one reference value and each pixel location in the globally-mapped input image sample having a correspondence with a corresponding pixel location in the input image sample, and computing a point-to-point color mapping function minimizing for all pixels an error between the globally-mapped input image sample and the input image sample mapped according to the color mapping function, the color mapping function transforming at least one color value of each pixel location in the input image sample to substantially match at least one color value of the corresponding pixel location in the globally-mapped input image sample.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
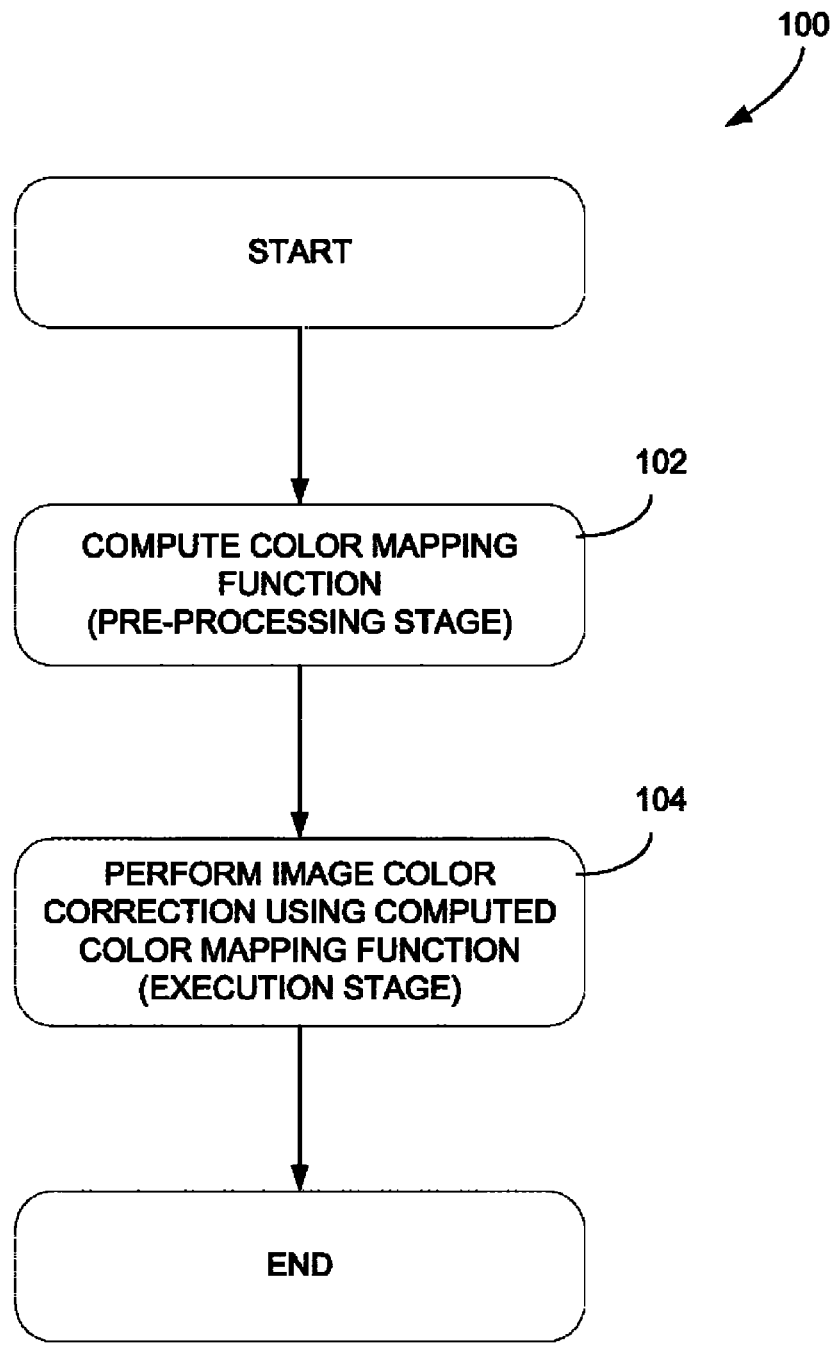
FIG. 1 illustrates a flowchart of a method for image color correction, in accordance with one embodiment.

Referring now to FIG. 1, an exemplary method 100 for image color correction will now be described. During a pre-processing stage, at step 102, a color mapping function is computed. Then, during an execution stage, at step 104, image color correction is performed using the color mapping function computed at step 102. In some embodiments, the computed color mapping function is stored in memory during the pre-processing stage and then retrieved from memory during the execution stage. In some embodiments, the pre-processing stage is performed offline and the execution stage is performed at run-time (e.g., in real-time); in other embodiments, both the pre-processing stage and the execution stage are performed at run-time.

The method 100 may be applied in many fields, such as but not limited to, camera calibration and color rendering. For example, the method 100 may be used in camera calibration applications, such as relative camera calibration (e.g., calibration to a reference camera) or absolute camera calibration (e.g., calibration to a standard color appearance). The method 100 may also be used in color rendering applications, such as color correction (e.g., removing a color casting/drifting effect), color reproduction (e.g., reproducing a color with a reference appearance), or chromatic adaptation (e.g., transforming color data across different illuminants). Other possible applications of the method 100 described herein will be readily understood.

Figure 2:
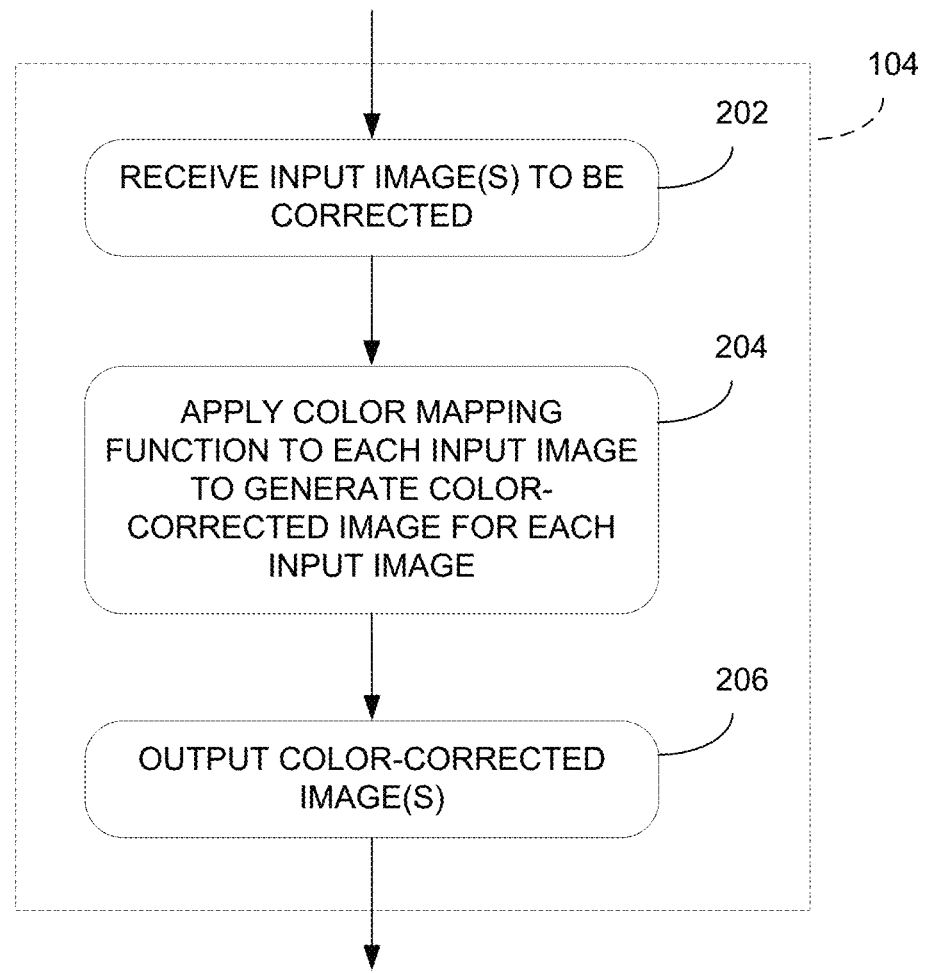
FIG. 2 illustrates a flowchart of the step of FIG. 1 of performing image color correction, in accordance with one embodiment.

Referring now to FIG. 2, the step 104 of performing image color correction illustratively comprises, at step 202, receiving one or more input images to be corrected. At step 204, the color mapping function is applied to each received input image to generate a color-corrected image for each input image. For this purpose, the color mapping function may be retrieved from memory. At step 206, the one or more color-corrected images are output.

As defined herein, an "image" consists of an array of color values. The dimension, N, of the array of color values may vary from one embodiment to another. In some embodiments, each location in the array may be associated with a single color value, such as a grayscale intensity value. Alternatively, each location in the array may be associated with a set of color values. In one embodiment, the set of color values is a set of color component values in an RGB color space. It should however be understood that the color values may represent information in another color space, such as, but not limited to, YUV, CIEXYZ, and CMY. In another embodiment, the set of color values may represent values in a "multispectral" color space.

In some embodiments, the array of color values represents an image (i.e., a "traditional" image), which may be acquired by an image acquisition device or generated by a computer. The image may consist of a still image or a frame of a video sequence. The image acquisition device may consist of a still camera or video camera, for example.

The array of color values may represent a two-dimensional image, in which each pixel location (i,j) has an associated color value $I(i,j)$ or set of color values $\bar{I}(i, j)$, where $\bar{I}(i,j)=[R(i,j),G(i,j),B(i,j)]$. The array of color values may also represent a one-dimensional (or line) image, in which each pixel location i has an associated color value $I(i)$ or set of color values $\bar{I}(i)$.

Alternatively, the array of color values may represent a three-dimensional image, in which each pixel (or voxel) location (i,j,k) has an associated color value $I(i,j,k)$ or set of color values $\bar{I}(i,j,k)$. As discussed herein, an image can be received by a variety of means. In some embodiments, the image may be received directly from an image acquisition device. In other embodiments, the image may be retrieved from a storage medium, such as a computer memory.

In other embodiments, the array of color values may represent another data set. For example, in some embodiments, the array of color values may consist of color values in a look-up table (LUT). The color values of the look-up table may be retrieved from memory or received by other means. As used herein, the term "image" is intended to cover any array of color values including the color values in a look-up table (LUT), for example.

Figure 3:
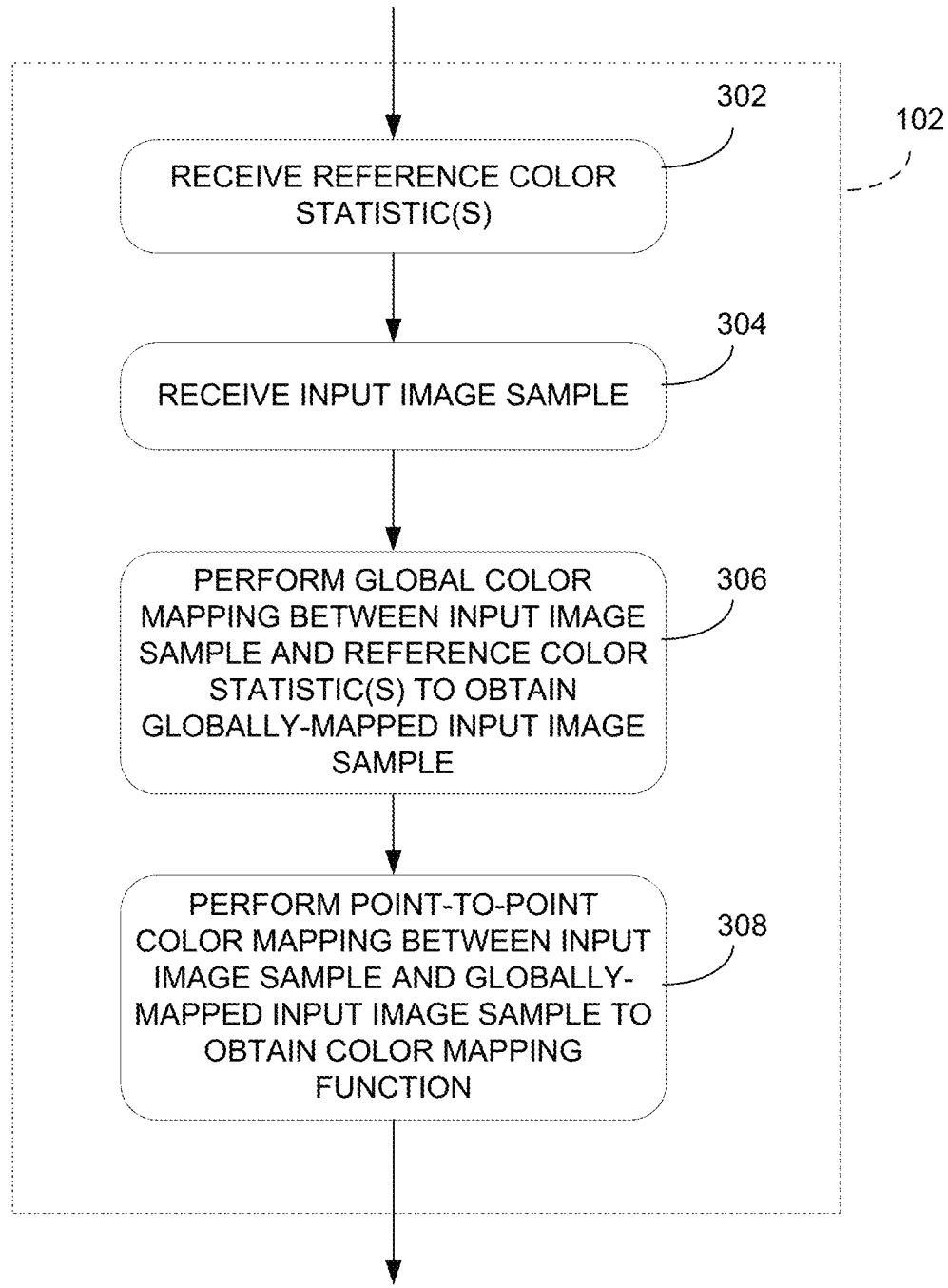
FIG. 3 illustrates a flowchart of the step of FIG. 1 of computing a color mapping function, in accordance with one embodiment.

Referring now to FIG. 3, the step 102 of computing a color mapping function comprises, at step 302, receiving one or more reference color statistics. Generally, the one or more reference color statistics received at step 302 provide information on a desired color distribution. At step 304, input image sample is received using any suitable means as discussed above. In some embodiments, the input image sample received at step 304 is an image having a similar color distribution as the input images to be corrected during the execution stage. For example, the input image sample and the input images to be corrected may be images acquired by a camera of a similar scene taken under similar lighting conditions. It should be understood that the order of steps 302 and 304 may be interchanged. Then, at step 306, a global color mapping is performed between the input image sample (received at step 304) and the one or more reference color statistics (received at step 302) to obtain a globally-mapped input image sample. Generally, the globally-mapped input image sample has color statistics that match (or resemble) the reference color statistic(s) and has direct pixel correspondence with the input image sample. Finally, at step 308, a point-to-point color mapping is performed between the input image sample (received at step 304) and the globally-mapped input image sample (obtained at step 306) to obtain a color mapping function. The color mapping function may then be applied to one or more input images to be corrected, as described with reference to FIG. 2.

Figure 4:
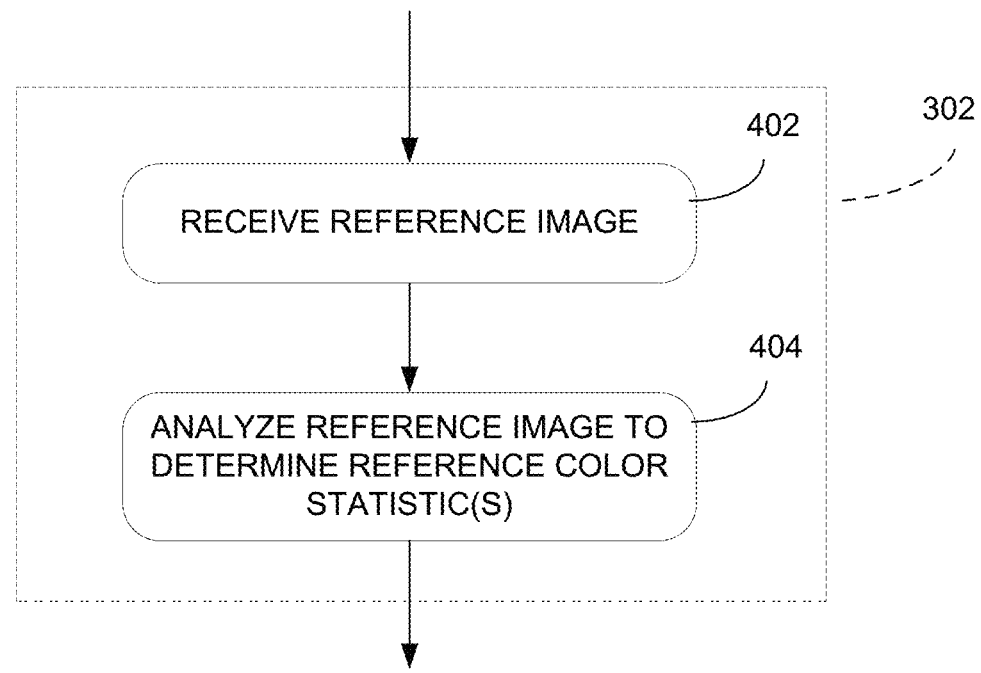
FIG. 4 illustrates a flowchart of the step of FIG. 3 of receiving one or more reference color statistics, in accordance with one embodiment.

Referring now to FIG. 4, the step 302 of receiving one or more reference color statistics may comprise receiving at step 402 a reference image. Generally, the reference image may be any suitable image having the desired color distribution and from which the reference color statistic(s) may be determined. As will be explained below, the reference image is not required to have pixel correspondence with the input image sample. The reference image may be received using any suitable means, as discussed above. The reference image is then analyzed at step 404 to determine therefrom the one or more reference color statistics. Step 404 may comprise extracting one or more color-related statistical properties of the reference image, such as, but not limited to, statistical moments, mean, variance, skewness, kurtosis, channel-independent histogram (e.g. a color histogram determined independently for each color channel), and multi-channel histogram (e.g. a color histogram determined for multiple color channels at once). The statistical properties may be extracted from the reference image using any suitable technique known to those skilled in the art. Alternatively, the one or more reference color statistics received at step 302 may be predefined and retrieved from memory or provided directly by a user.

Returning to FIG. 3, as will be discussed further below, the global color mapping technique (step 306) and the point-to-point color mapping technique (step 308) complement each other to provide an optimal color mapping technique. Preceding the point-to-point color mapping technique with the global color mapping technique removes the requirement for pixel correspondence between the input image sample and the reference image. Indeed, performing the global color mapping at step 306 leads to a globally-mapped version of the input image sample whose data alignment with the input image sample is intrinsic. Following the global color mapping technique with the point-to-point technique effectively enables automation of the global color mapping technique by allowing the computation of a single color mapping function that can be applied directly to all input images during the execution stage. In addition, in certain embodiments, the point-to-point color mapping technique may compensate for possible color artifacts introduced by the global color mapping technique.

Figure 5:
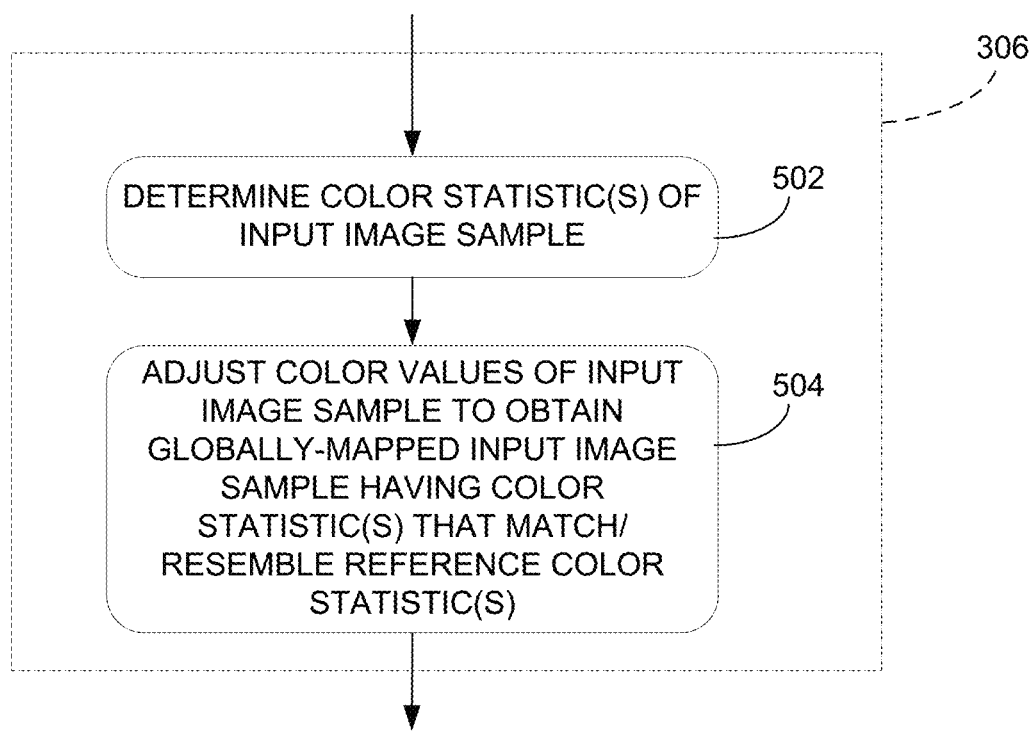
FIG. 5 illustrates a flowchart of the step of FIG. 3 of performing a global color mapping, in accordance with one embodiment.

Referring now to FIG. 5, the step 306 of performing a global color mapping illustratively comprises determining the color statistic(s) of the input image sample at step 502 and adjusting at step 504 the color values of the input image sample to obtain the globally-mapped input image sample having color statistic(s) that match (or resemble) the one or more reference color statistics. In one embodiment discussed further below with reference to FIGS. 9, 10, and 11, a Histogram Specification (HS) technique, also referred to as Histogram Matching (HM), is illustratively used as the global color mapping technique at step 306. The HS technique transforms the color values of the input image sample such that the globally-mapped input image sample has a color histogram that matches (or resembles) a reference color histogram (e.g., the color histogram of a reference image). In another embodiment, a "color transfer" technique based on a reference image or based on one or more reference color statistics may be used. Other global mapping methods may be used at step 306. In some embodiments, the global mapping method used at step 306 is a method that transforms color values in the input image sample such that a same color value in the input image sample (i.e., appearing at different pixel locations in the input image sample) may be mapped to multiple different color values in the globally-mapped input image sample, such that the method cannot be directly automated. In other embodiments, the global mapping method is a method that cannot be directly automated for other reasons.

Figure 6A:
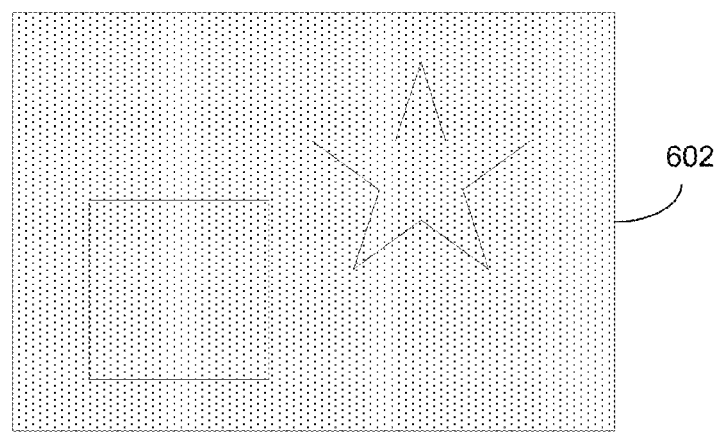
FIG. 6A is a schematic diagram of an exemplary reference image, in accordance with one embodiment.
Figure 6B:
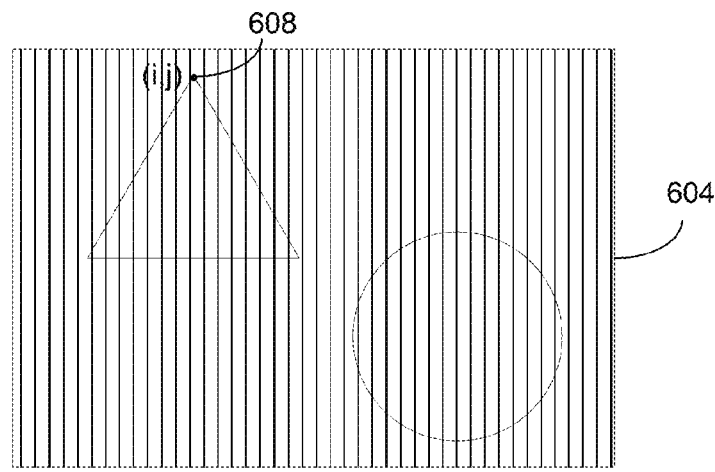
FIG. 6B is a schematic diagram of an exemplary input image sample, in accordance with one embodiment.
Figure 6C:
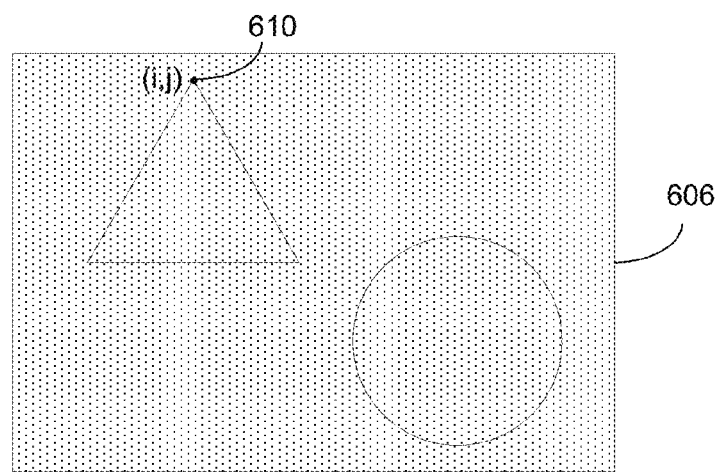
FIG. 6C is a schematic diagram of an exemplary globally-mapped input image sample, in accordance with one embodiment.

FIGS. 6A, 6B, 6C respectively illustrate an exemplary reference image 602, an exemplary input image sample 604, and an exemplary globally-mapped input image sample 606 that may be used to compute a color mapping function during a pre-processing stage at step 102 of FIG. 1. The reference image 602 has a given color appearance (shown, for illustration purposes, by the dotted pattern) and corresponding color statistic and given spatial information (shown, for illustration purposes, by the square and star shapes) representing elements of a scene captured by a camera for example. The input image sample 604 has a different color appearance (illustrated by the vertically-striped pattern) and has different spatial information (illustrated by the triangle and circle shapes) than the reference image 602. The globally-mapped input image sample 606, which is obtained by performing a global color mapping between the input image sample 604 and the reference image 602 (step 306 of FIG. 3), has a similar color appearance (illustrated by the dotted pattern), and accordingly has a matching or similar color statistic, as the reference image 602. Still, the globally-mapped input image sample 606 retains the spatial information of the input image sample 604, it is aligned or has direct pixel correspondence therewith. This is illustrated by the fact that the globally-mapped input image sample 606 includes the same triangle and circle as the input image sample 604 positioned at the same locations in both images.

Figure 7:
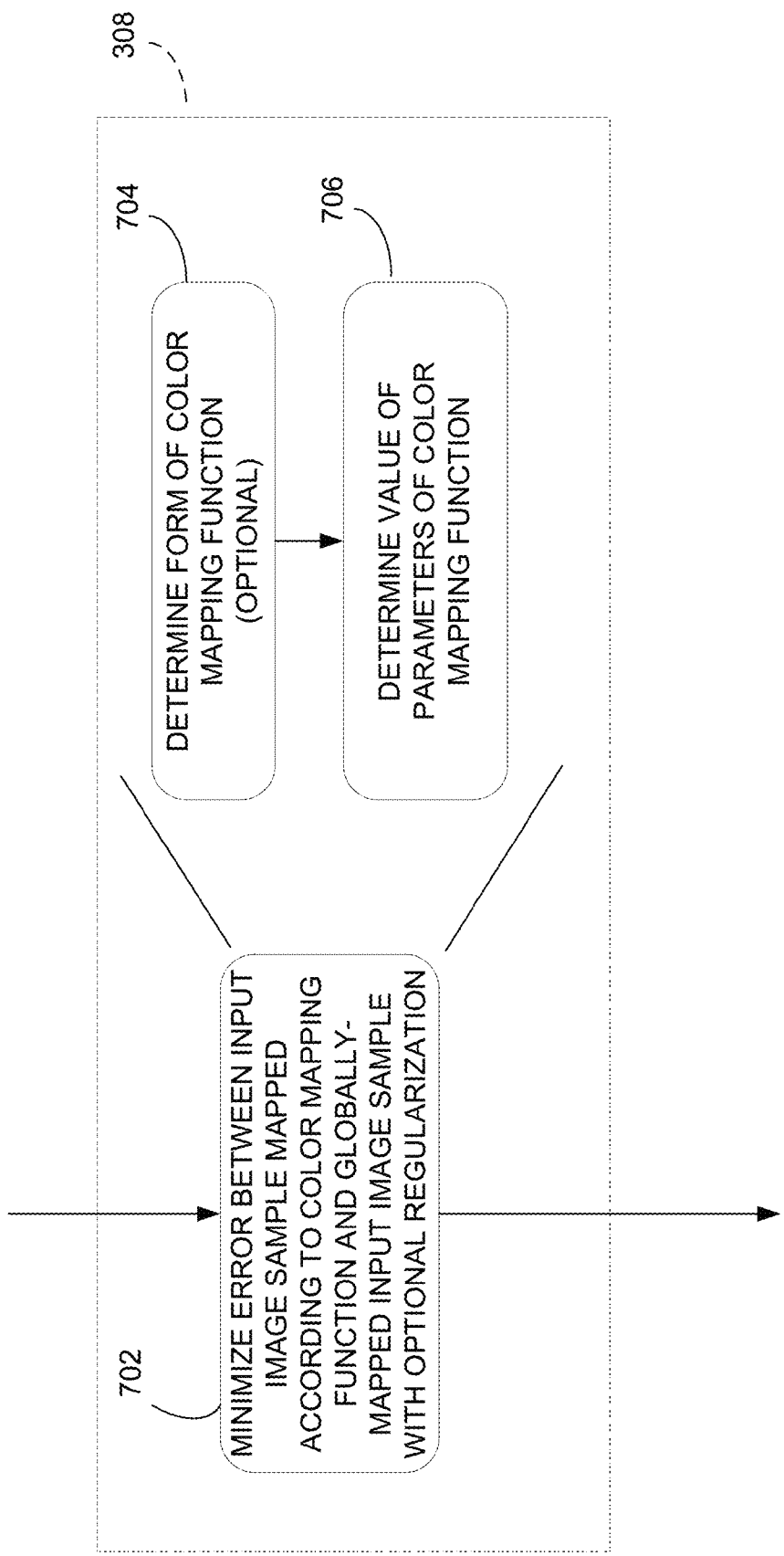
FIG. 7 illustrates a flowchart of the step of FIG. 3 of performing a point-to-point color mapping, in accordance with one embodiment.

Referring now to FIG. 7, the step 308 of performing a point-to-point color mapping computes a color mapping function between the input image sample and the globally-mapped input image sample. Generally, a color mapping function is a function that receives for input a color value (in a given color space) and returns as output a color value (generally in the same color space) as the mapped color value. Generally, the color mapping function maps each possible input color value to a single output color value. Generally, the step 308 of performing a point-to-point color mapping aims to find a color mapping function that transforms the color value at each pixel location in the input image sample to match the color value at the corresponding pixel location in the globally-mapped input image sample. In the example of FIG. 6, the point-to-point color mapping aims to find a color mapping function that transforms the color value 608 at each pixel location (i,j) in the input image sample 604 to match the color value 610 at the corresponding pixel location (i,j) in the globally-mapped input image sample 606. In practice, the step 308 of performing a point-to-point color mapping aims to find a color mapping function that minimizes an error between the color values of the input image sample transformed according to the color mapping function and the color values at corresponding pixel locations in the globally-mapped input image sample, and this, over the set of pixel locations. Therefore, step 308 illustratively comprises minimizing at step 702 an error between the input image sample mapped according to the color mapping function and the globally-mapped input image sample. The error to be minimized may be expressed in different forms. In some embodiments, the error to be minimized may be represented in an L-norm form, such as an L1-norm (which leads to a Least-Absolute-Deviation problem), an L2-norm (which leads to a Least-Square Error (LSE) problem), or a p-norm form. In other embodiments, the error to be minimized may be represented in combinational form (which leads to a variational problem).

As illustrated in FIG. 7, step 702 may comprise optionally determining at step 704 the form of the color mapping function (if the form of the color mapping function is not known) and determining at step 706 the values of parameters of the color mapping function.

Various techniques may be used to solve the error minimization problem, such as, but not limited to, Pseudo Inverse (PI), Levenberg-Marquardt, Newton, Gauss-Newton, Weinszfeld, and Thin-Plate-Spline (TPS). Generally, a suitable technique is chosen based on the form of the error to be minimized. For example, a Weinszfeld algorithm may be used to solve the error minimization problem for errors of the L1-norm form. A PI technique may be used to find a linear LSE solution to the error minimization problem for errors of the L2-norm form. A Levenberg-Marquardt, Newton, or Gauss-Newton technique may be used to find a non-linear LSE solution to the error minimization problem for errors of the L2-norm form. A TPS technique may be used to find a solution to the error minimization problem for errors of the combinational form. In one embodiment discussed further below with reference to FIGS. 9 and 12, the PI technique is used as the point-to-point color mapping technique applied in step 308.

In some embodiments, a regularization technique may be introduced into step 702 to make the point-to-point color mapping function more robust against future outliers not belonging to the image training set (e.g., color values appearing in the input image(s) during the execution stage that did not appear in the input image sample during the pre-processing stage). The regularization method reduces the risk of data over-fitting (i.e. difficulty in predicting results outside of fitted points) that may be associated with the point-to-point color mapping technique. Indeed, in point-to-point color mapping, using higher-order data usually gives better data-fitting precision compared to lower-order data. However, the solution obtained by applying the point-to-point color mapping technique is only optimal for the training set used to perform the data mapping. Without regularization, the solution may be instable to data outliers due to the increased risk of over-fitting for non-training images. Applying regularization therefore renders the proposed color mapping technique more robust against outlier data by reducing data over-fitting. In addition, introducing a regularization technique into step 702 may reduce the effect of any color distortion (e.g., false colors) that may be introduced by the global color mapping technique. Examples of regularization techniques include linear regularization techniques, such as Tikhonov Regularization (TR), and non-linear regularization techniques.

As discussed above, after the color mapping function has been computed (step 102 of FIG. 1), the color mapping function is applied to each input image to be corrected to obtain a corresponding color-corrected image (step 204 of FIG. 2). The color mapping function is applied to the color value at each pixel location in the input image to obtain the color value for the corresponding pixel location in the color-corrected image. The resulting color-corrected image has color statistics that match (or resemble) the reference color statistic(s). In other words, the resulting color-corrected image has a color distribution that matches or resembles the desired color distribution provided by the reference image or reference color statistics. This is illustrated in FIG. 8A and FIG. 8B.

Figure 8A:
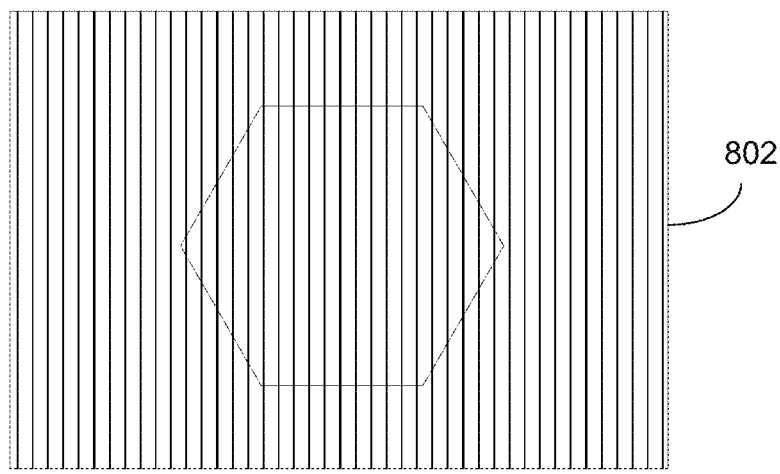
FIG. 8A is a schematic diagram of an exemplary input image to be corrected, in accordance with one embodiment.
Figure 8B:
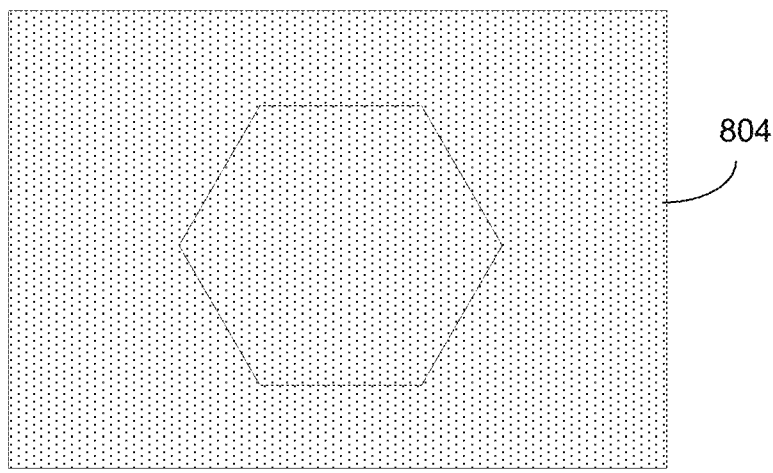
FIG. 8B is a schematic diagram of an exemplary output image resulting from performing image color correction to the input image of FIG. 8A, in accordance with one embodiment.

FIG. 8A and FIG. 8B respectively illustrate an exemplary input image 802 to be corrected and an exemplary color-corrected image 804 that may be involved in an execution stage at step 104 of FIG. 1. The input image 802 has a given color appearance (illustrated by the vertically-striped pattern) which is similar to that of the input image sample 604 in FIG. 6B. The color-corrected image 804, which is obtained by applying the color mapping function (step 204), has the desired color appearance (illustrated by the dotted pattern) of the reference image 602 of FIG. 6A.

Figure 9:
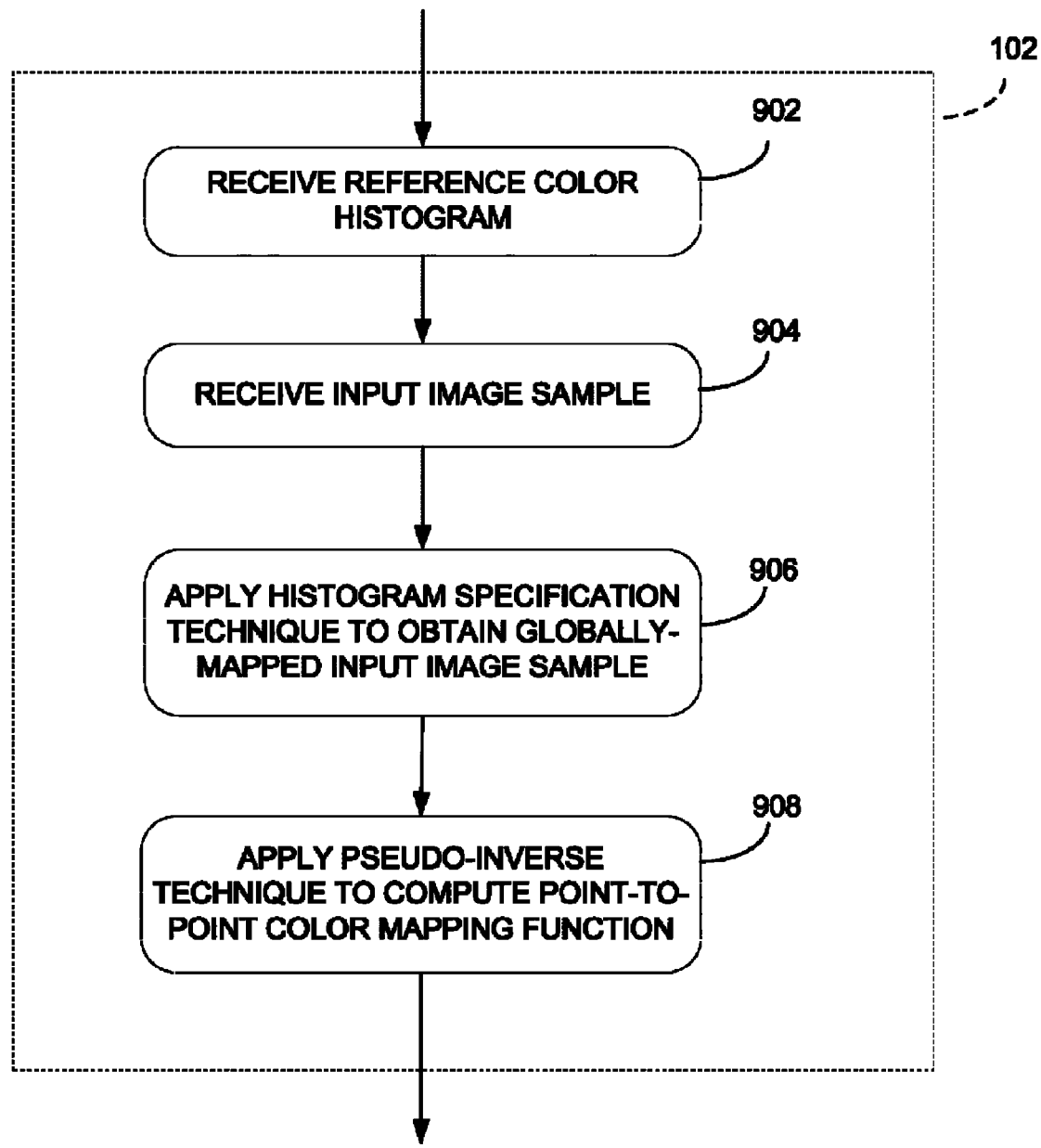
FIG. 9 illustrates a flowchart of the step of FIG. 1 of computing a color mapping function by cascading the Histogram Specification and Pseudo-Inverse techniques, in accordance with one embodiment.
Figure 10:
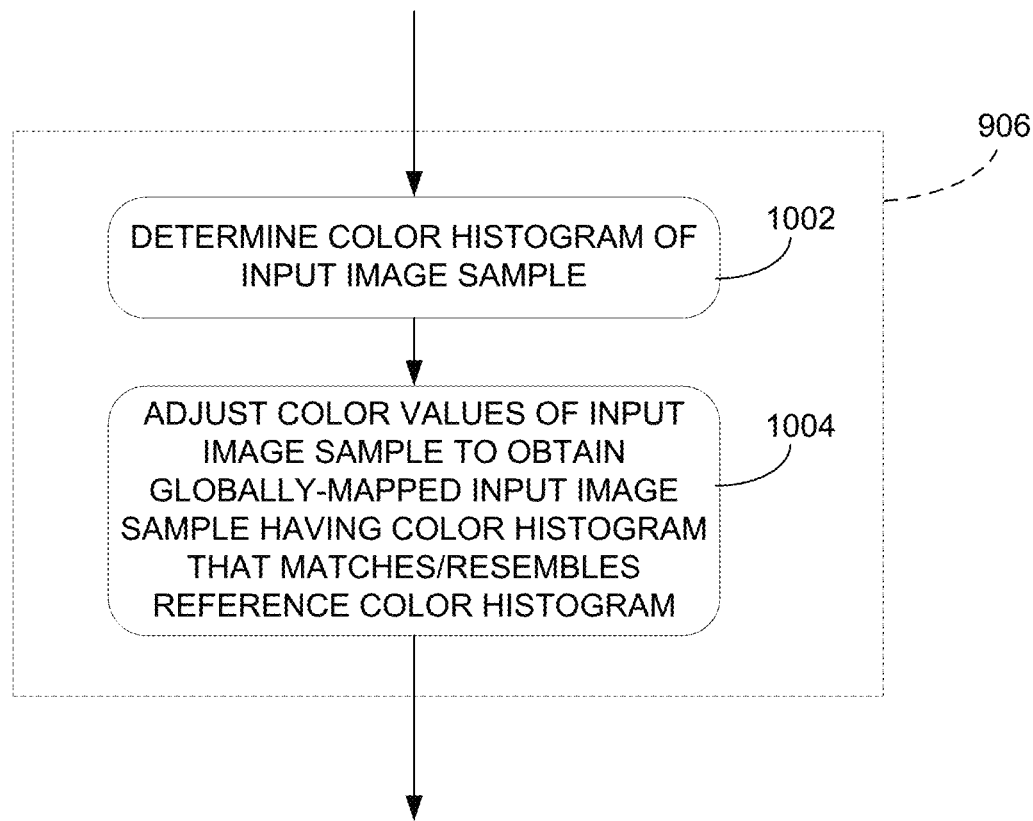
FIG. 10 illustrates a flowchart of the step of FIG. 9 of applying the Histogram Specification technique.

Referring now to FIGS. 9 to 13, there is described an exemplary embodiment of the method 100 for image color correction in which Histogram Specification (HS) is used as the global color mapping technique and Pseudo Inverse (PI) is used as the point-to-point color mapping technique. In this embodiment, the step 102 of computing a color mapping function comprises receiving a reference color histogram at step 902 and receiving an input image sample at step 904, as illustrated in FIG. 9. The reference color histogram may be determined by computing the color histogram of each color channel in a reference image. Alternatively, a predefined reference color histogram may be retrieved from memory.

As referred to herein, a color histogram is a representation of the distribution (e.g. frequency) of each color in a given image. For digital images, a color histogram represents the number of pixels that have colors in each of a fixed list of color ranges that span the image's color space, the set of all possible colors. At step 902, the reference color histogram may be produced in the color space used to perform the color mapping by discretizing the colors in the reference image into a number of bins, and counting the number of image pixels in each bin. A frequency may then be associated with each bin, corresponding to the number of occurrences of the bin's color channel intensity within the reference image. The frequency of each bin is calculated based on the individual frequencies of its constituent pixels. The bin frequencies may then be normalized between 0.0 and 1.0, with 1.0 representing the sum of the frequencies of all bins. The computed histogram then provides a compact summarization of the distribution of data in an image.

Figure 11:
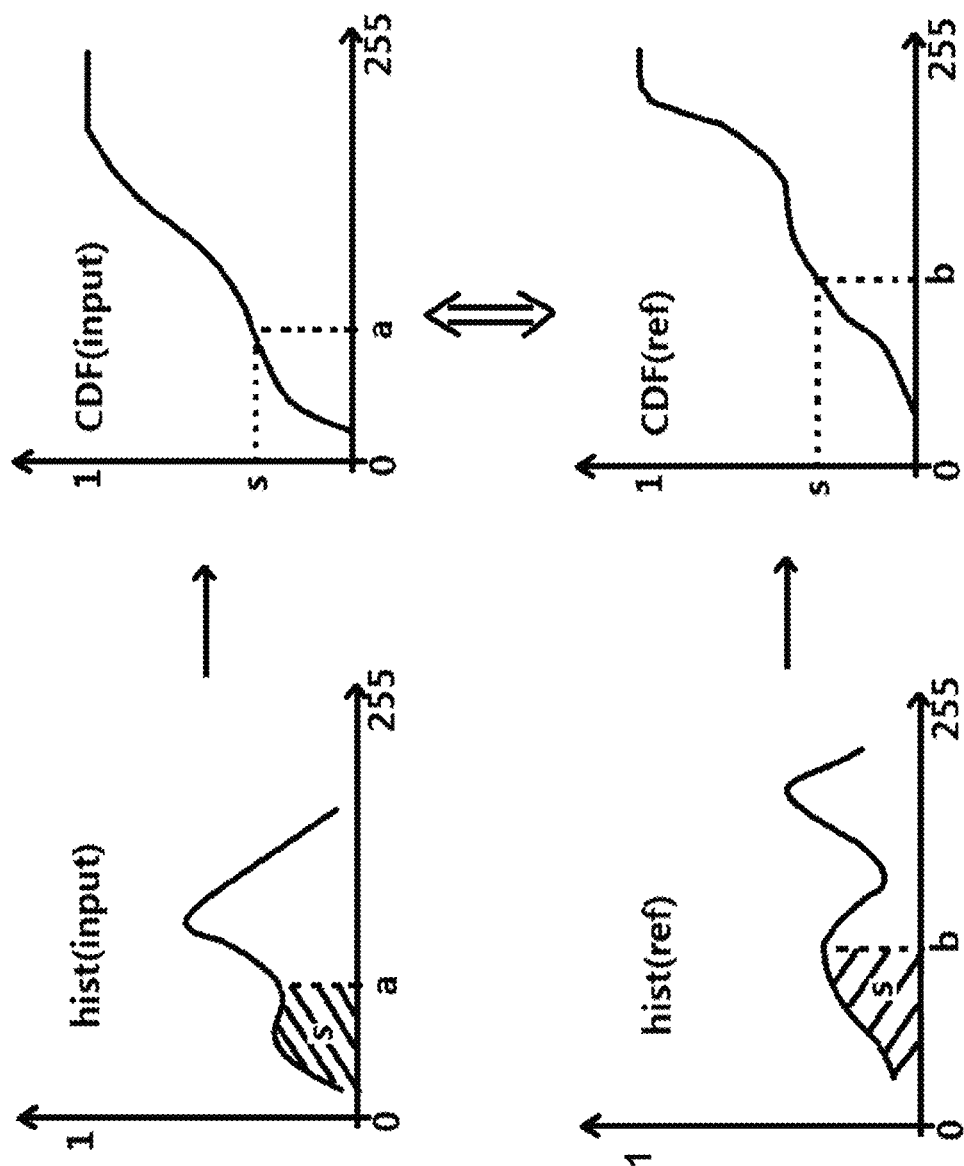
FIG. 11 is a schematic diagram of input image sample and reference color histograms and input image sample and reference Cumulative Distribution Functions, in accordance with one embodiment.

After the reference color histogram and the input image sample have been received, the next step 906 is to apply the HS technique to obtain the globally-mapped input image sample. For this purpose, and as illustrated in FIG. 11, the color histogram of each color channel (e.g. each one of the R, G, and B channels) in the input image sample may first be determined at step 1002. Then the color values of the input image sample are adjusted (i.e. transformed) at step 1004 to obtain the globally-mapped input image sample having a color histogram that matches the reference color histogram. It should be understood that the above-mentioned histogram matching may be performed at step 906 independently for each color channel in the input image sample or at once for all color channels.

In some embodiments, the cumulative distribution functions (CDF) of the reference image and the input image sample may be used to perform the HS technique. As illustrated in FIG. 11, the color histogram of the input image sample, labelled hist(input), differs from the reference color histogram, labelled hist(ref). The HS technique is then performed to match the histograms, i.e. determine a value ("b") that a given color value as in "a" in the input image sample should be modified to in order to obtain an image that has a similar color histogram as the reference image. This is achieved by first computing the CDFs of the two histograms, namely the CDF of the input image sample (or input CDF, labelled CDF(input) in FIG. 11) and the CDF of the reference image (or reference CDF, labelled CDF(ref) in FIG. 11). It should be understood that the curves shown in FIG. 11 are for illustrative purposes only and therefore purely schematic. The value "b" can then be found by comparing the two CDFs. In particular, for each color value "a" in the input image sample, the corresponding value "s" in the input CDF is found. This value "s" is then used in the reference CDF to locate the target color value "b", which is the desired color value the input color value "a" should be modified to. The color value "a" is therefore set to the value "b" and the process repeated for all remaining color values in the input image sample. Once the color values have been adjusted to their target values, a resulting image (i.e. the globally-mapped input image sample) is obtained, which has the same color histogram, and therefore manifests similar color appearance, as the reference image (as illustrated in FIG. 6C).

The above-mentioned HS technique can be modeled mathematically as follows:

$$h_i = \frac{m_i}{M}, s_k = \sum_{i=0}^{k} h_i = \sum_{i=0}^{k} \frac{m_i}{M}, k = 0, 1, 2, \ldots, L-1; \quad (1)$$

$$v_k = G(g_j) = \sum_{j=0}^{k} g_j = \sum_{j=0}^{k} \frac{n_j}{N}, k = 0, 1, 2, \ldots, L-1; \quad (2)$$

where $h_i$ is the histogram of the input image sample for each color value i, $s_k$ is the CDF of $h_i$, $g_j$ is the histogram of the reference image for each color value j, and $v_k$ is its corresponding CDF, M is the total number of pixels in the input image sample, N is the total number of pixels in the reference image, $m_i$ is the number of pixels with gray level of i in the input image sample, $n_j$ is the number of pixels with gray level of j in the reference image, and L is the number of discrete gray levels (for a grayscale image).

The HS technique then aims to find the function $G^{-1}$ such that:

$$j = G^{-1}(s_k) = G^{-1}\left(\sum_{i=0}^{k} \frac{n_i}{N}\right), k = 0, 1, 2, \ldots, L-1; \quad (3)$$

By equation (3), each input color value i whose CDF value is $s_k$ can find its desired corresponding color value j in the reference image whose CDF is of the same value as $s_k$. As a result, the globally-mapped input image sample, after histogram matching, will have the same CDF values as the reference image. Therefore, their histograms (as well as the color appearance) will resemble each other.

In other embodiments, the HS technique may be performed using the histograms of the reference image and input image sample without using the cumulative distribution functions.

Figure 12:
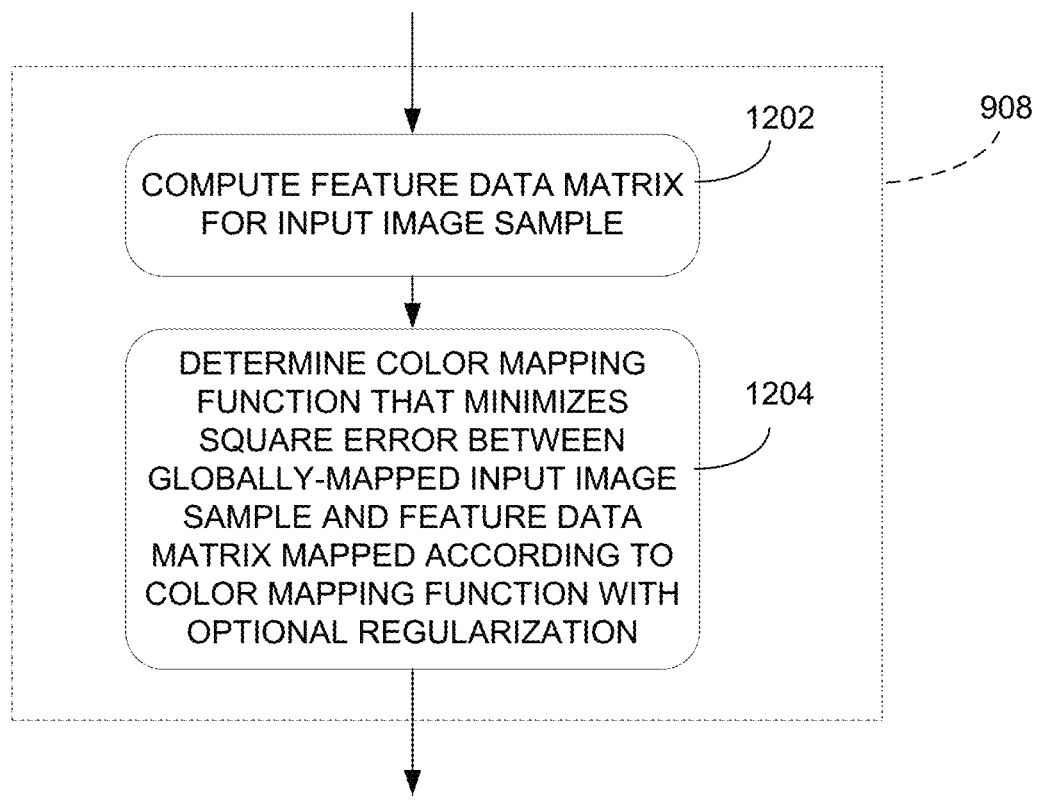
FIG. 12 illustrates a flowchart of the step of FIG. 9 of applying the Pseudo-Inverse technique, in accordance with one embodiment.

Referring now to FIG. 12 in addition to FIG. 9, in the illustrated embodiment, the PI technique is applied at step 908 to compute the point-to-point color mapping function. As discussed above, the PI technique minimizes an error between the globally-mapped input image sample and the input image sample mapped according to the color mapping function. For this purpose, step 908 illustratively comprises computing 1202 a color feature data matrix X for the input image sample on the basis of the color attributes (i.e. the RGB values) present within the input image sample. The feature data matrix, elements of which may comprise a combination of color attributes, will then be used for data mapping (rather than directly using the color values themselves). The feature data matrix may be computed taking into account computation cost and calibration intent, which may include a focus on robustness against outliers and/or on calibration precision.

Several feature data sets may therefore be generated depending on the statistical significance of the features during data fitting, with the selection of the features to be computed for the feature data matrix resulting from knowledge of color image formation and empirical tests, for example. In one embodiment, three (3) feature data sets may be generated.

When general robustness against outliers is the main calibration intent, the following color feature data matrix X may illustratively be used:

$$X = \begin{pmatrix} R_1 & R_2 & \ldots & R_m \\ G_1 & G_2 & \ldots & G_m \\ B_1 & B_2 & \ldots & B_m \\ R_1G_1 & R_2G_2 & \ldots & R_mG_m \\ G_1B_1 & G_2B_2 & \ldots & G_mB_m \\ B_1R_1 & B_2R_2 & \ldots & B_mR_m \\ 1 & 1 & \ldots & 1 \end{pmatrix} \quad (4)$$

where m is the number of data elements in the input image sample (e.g. the number of pixels or the number of values in the array of color values). The features $R_i$, $G_i$, $B_i$ represent the color intensities for a pixel i in the image. The features $R_iG_i$, $G_iB_i$, $B_iR_i$ are related to the covariance of a pixel i in the image, i.e. the degree to which a given color value varies according to another color value or the degree of cross-correlation between the color channels. For example, the feature RG indicates the degree to which the red channel varies according to the green channel. The constant value 1 is introduced into the feature data matrix X to take into account the intensity offset from one image to another and therefore map a mean value during data fitting.

When it is desired to achieve a balance between general robustness against outliers and calibration precision, the following color feature data matrix X may illustratively be used:

$$X = \begin{pmatrix} R_1 & R_2 & \ldots & R_m \\ G_1 & G_2 & \ldots & G_m \\ B_1 & B_2 & \ldots & B_m \\ R_1G_1 & R_2G_2 & \ldots & R_mG_m \\ G_1B_1 & G_2B_2 & \ldots & G_mB_m \\ B_1R_1 & B_2R_2 & \ldots & B_mR_m \\ R_1^2 & R_2^2 & \ldots & R_m^2 \\ G_1^2 & G_2^2 & \ldots & G_m^2 \\ B_1^2 & B_2^2 & \ldots & B_m^2 \\ R_1^3 & R_2^3 & \ldots & R_m^3 \\ G_1^3 & G_2^3 & \ldots & G_m^3 \\ B_1^3 & B_2^3 & \ldots & B_m^3 \\ 1 & 1 & \ldots & 1 \end{pmatrix} \quad (5)$$

where the color features $R^2$, $G^2$, $B^2$ relate to the variance of the red, green, and blue color values, respectively (i.e. the degree to which each color value varies), and the color features $R^3$, $G^3$, $B^3$ relate to the skewness or dominant tone of the image. The variance may be related to the image contrast or camera gain setting.

When calibration precision is the main intent, more features may be computed and the following color feature data matrix X may illustratively be used:

$$X = \begin{pmatrix} R_1 & R_2 & \ldots & R_m \\ G_1 & G_2 & \ldots & G_m \\ B_1 & B_2 & \ldots & B_m \\ R_1G_1 & R_2G_2 & \ldots & R_mG_m \\ G_1B_1 & G_2B_2 & \ldots & G_mB_m \\ B_1R_1 & B_2R_2 & \ldots & B_mR_m \\ R_1^2 & R_2^2 & \ldots & R_m^2 \\ G_1^2 & G_2^2 & \ldots & G_m^2 \\ B_1^2 & B_2^2 & \ldots & B_m^2 \\ R_1^3 & R_2^3 & \ldots & R_m^3 \\ G_1^3 & G_2^3 & \ldots & G_m^3 \\ B_1^3 & B_2^3 & \ldots & B_m^3 \\ R_1^2G_1 & R_2^2G_2 & \ldots & R_m^2G_m \\ R_1^2B_1 & R_2^2B_2 & \ldots & R_m^2B_m \\ G_1^2R_1 & G_2^2R_2 & \ldots & G_m^2R_m \\ G_1^2B_1 & G_2^2B_2 & \ldots & G_m^2B_m \\ B_1^2R_1 & B_2^2R_2 & \ldots & B_m^2R_m \\ B_1^2G_1 & B_2^2G_2 & \ldots & B_m^2G_m \\ R_1G_1B_1 & R_2G_2B_2 & \ldots & R_mG_mB_m \\ 1 & 1 & \ldots & 1 \end{pmatrix} \quad (6)$$

Once the feature data matrix has been computed, the next step 1204 is then to determine a function $f$ (i.e. the color mapping function) that minimizes the calibration error E(X) between the globally-mapped input image sample and the feature data mapped according to the function. In the illustrated embodiment, the error is expressed in L-2 norm and step 1204 therefore comprises determining the function that minimizes, for all pixels, the least-square error between the globally-mapped input image sample and the feature data mapped according to the color mapping function. The following equation therefore applies:

$$\min_{X \in R^k} E(X), \text{ where } E(X) = Y - f(X) \quad (7)$$

The solution to equation (7) may then be modeled to have a polynomial form, such as $(y = c_1x_1 + c_2x_2 + \ldots + c_nx_n)$. It should be understood that the polynomial form is used for simplicity purposes and that other forms may apply. Equation (7) can then be expressed as a linear system as follows:

$$\begin{cases} a_{11}x_1 + a_{12}x_2 + \ldots + a_{1q}x_q = y_1 \\ a_{21}x_1 + a_{22}x_2 + \ldots + a_{2q}x_q = y_2 \\ \ldots \\ a_{p1}x_1 + a_{p2}x_2 + \ldots + a_{pq}x_q = y_p \end{cases} \quad (8)$$

When written in matrix operation, for simplicity of writing, we obtain:

$$A = \begin{pmatrix} a_{11} & a_{12} & \ldots & a_{1q} \\ a_{21} & a_{22} & \ldots & a_{2q} \\ \ldots & \ldots & \ldots & \ldots \\ a_{p1} & a_{p2} & \ldots & a_{pq} \end{pmatrix}, X = \begin{pmatrix} x_1 \\ x_2 \\ \ldots \\ x_q \end{pmatrix}, Y = \begin{pmatrix} y_1 \\ y_2 \\ \ldots \\ y_p \end{pmatrix} \quad (9)$$

Taken into account that the error form is L-2 norm and that the solution is a polynomial approximation, the minimization problem can then be expressed as:

$$\min_{X \in R^k} E(X) \text{ where} \qquad (10)$$

$$E(X) \stackrel{def}{=} \sum_{i=1}^{p} (a_{i1}x_1 + a_{i2}x_2 + \ldots + a_{iq}x_q - y_i)^2 = \|Y - AX\|^2$$

PI is a classic solution to minimize E(x) in equation (10). Therefore, the color transform matrix A can be deduced given X and Y as follows:

$$A = YX^T(XX^T)^{-1} \qquad (11)$$

In equation (11), Y represents the RGB values of the globally-mapped input image sample and X represents the set of feature data computed for the input image sample using the input RGB values. Therefore, all variables in equation (11) are known and the transform matrix A can be obtained using the input image sample data and the globally-mapped input image sample data.

Pursuing with the example above, in which the input image feature data is given by equation (4), the RGB values of the globally-mapped input image sample may be given by:

$$Y^T = \begin{pmatrix} R'_1 & G'_1 & B'_1 \\ R'_2 & G'_2 & G'_2 \\ \ldots & \ldots & \ldots \\ R'_m & G'_m & B'_m \end{pmatrix} \qquad (12)$$

where m is the number of data elements in the globally-mapped input image sample.

In this example, the transform matrix A can then be written as:

$$A = \begin{pmatrix} a_{11} & a_{12} & a_{13} & a_{14} & a_{15} & a_{16} & a_{17} \\ a_{21} & a_{22} & a_{23} & a_{24} & a_{25} & a_{26} & a_{27} \\ a_{31} & a_{32} & a_{33} & a_{34} & a_{35} & a_{36} & a_{37} \end{pmatrix} \qquad (13)$$

where the elements of matrix A are the coefficients of the polynomial solution to the error minimization problem.

As discussed above, it is desirable to overcome the data over-fitting issue of PI, which occurs when using numerous features, e.g. numerous color features in the feature data matrix, with too little training data. Such data over-fitting renders the PI solution instable to outliers. Therefore, it is desirable to introduce a regularization technique into the PI technique, e.g. within the process of computing coefficients of the transform matrix A. One example of a linear regularization technique applicable to PI is the TR, which is a classic linear technique that gives preference to small-coefficient solutions when minimizing the cost function (i.e. the error) of the Least-Square problem. Using coefficients of small magnitude, it is possible to reduce the error amplification effect that may be associated with outlier data. Indeed, in a polynomial transform, taking $y = ax_1 + bx_2 + cx_3$, if $x_3$ contains outlier data and introduces an error, if the coefficient c of $x_3$ is small, the error will not be much amplified and y will be less influenced by $x_3$. In this manner, choosing smaller coefficients allows to make the data fitting less error-prone in the presence of outliers.

Applying the TR technique within PI at step 1204, since preference is given to smaller-valued coefficients to form the polynomial function, the values of the coefficients within the transform matrix A are minimized while seeking the solution that minimizes the error function given in equation (10). The minimization target $$\min_{X \in R^k} E(X) \text{ where} \qquad (10)$$

$$E(X) \stackrel{def}{=} \sum_{i=1}^{p} (a_{i1}x_1 + a_{i2}x_2 + \ldots + a_{iq}x_q - y_i)^2 = \|Y - AX\|^2$$

where $$E(X) = \|Y - AX\|^2 + \|\Gamma X\|^2 \qquad (14)$$

With a similar deduction as in equation (11), the transform matrix A can then be constructed as:

$$A = YX^T(XX^T + \Gamma\Gamma^T)^{-1} \qquad (15)$$

In practice, a shortcut to implementing TR is to use the identity matrix for $\Gamma$. The transform matrix A then becomes:

$$A = YX^T(XX^T + I)^{-1} \qquad (16)$$

where I is an identity matrix.

Figure 13:
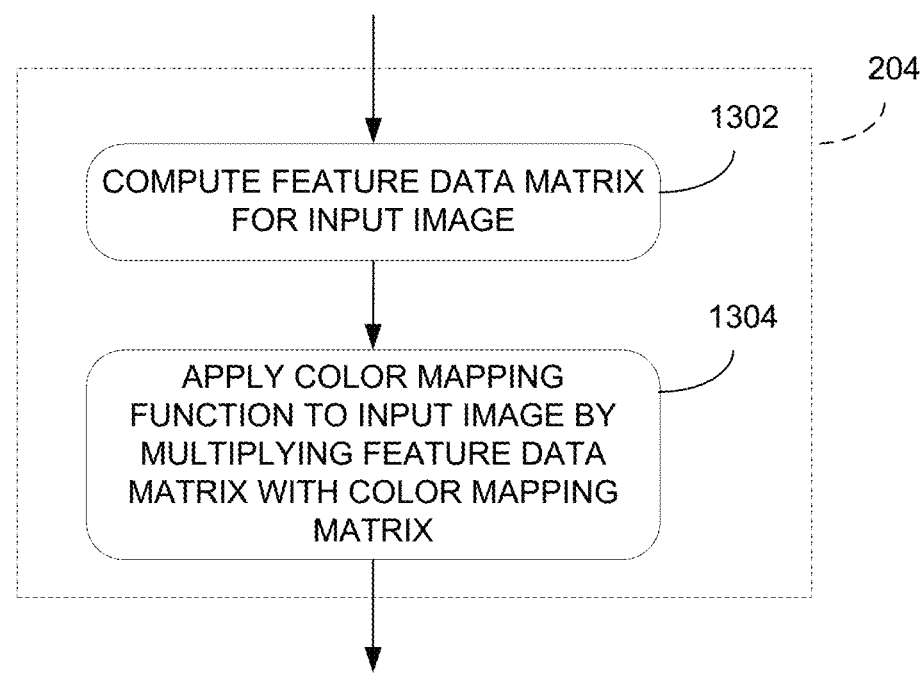
FIG. 13 illustrates a flowchart of the step of FIG. 2 of applying the color mapping function computed according to the steps illustrated in FIG. 9, in accordance with one embodiment.

Once the color mapping function has been obtained, it is then applied to each input image received at runtime and an output image is generated accordingly (as discussed above with reference to FIG. 2). In the embodiment discussed above with reference to FIGS. 9, 10, 11, and 12 where PI is used as the point-to-point color mapping technique (following application of HS as the global color mapping technique), output images are generated by applying the transform matrix A to each input image. As illustrated in FIG. 13, the step 204 of FIG. 2 of applying the color mapping function to each input image therefore comprises computing at step 1302 a feature data matrix U for the input image using the RGB values of the input image, as discussed above with reference to FIG. 12. The color mapping function is then applied at step 1304 to the input image by multiplying the feature data matrix with matrix A. The resulting output image can then be written as:

$$\hat{Y} = AU \qquad (17)$$

where $\hat{Y}$ is the output image, U is the feature data matrix for the input image, and A is the transform matrix. The output image $\hat{Y}$ has color statistics that resemble the reference color statistics (e.g., the color statistics of the reference image).

The particular combination of HS and PI discussed above with reference to FIGS. 9 to 13 provides a color correction method that achieves a trade-off between precision and robustness. Each technique enables the functionality of the other technique while cancelling its undesirable side effects. Indeed, using HS as global color mapping does not allow to achieve a one-to-one (or color-to-color) mapping since the HS technique typically achieves a one-to-many mapping that introduces false colors. Control of color artifacts for HS is therefore still an open issue. By following HS with PI, as discussed above, it is possible to remove by polynomial approximation the false colors introduced by HS. Moreover, since the HS technique does not lead to a single color mapping function that can be applied directly to all input images, combining PI with HS offers the advantage of enabling automation of HS. Furthermore, the precision of PI processing being capped by the precision of the global color mapping step, combining the precision of HS with PI proves to be judicious. Also, as discussed above, preceding the PI technique with HS removes the requirement for pixel correspondence that is the typical barrier of PI.

In addition, as discussed above, risks of data over-fitting are one of the major obstacles for directly applying PI at the image level and remain one of the major unsolved issues for using the PI method in color image calibration applications. Introducing regularization techniques, and more particularly Tikhonov regularization, into PI removes this obstacle and renders the overall solution robust against outliers. Application of the regularization technique in PI also cancels the color distortion introduced by HS. The combination of PI and regularization can then be applied directly to color image processing to obtain a color transform used for calibration.

Figure 14:
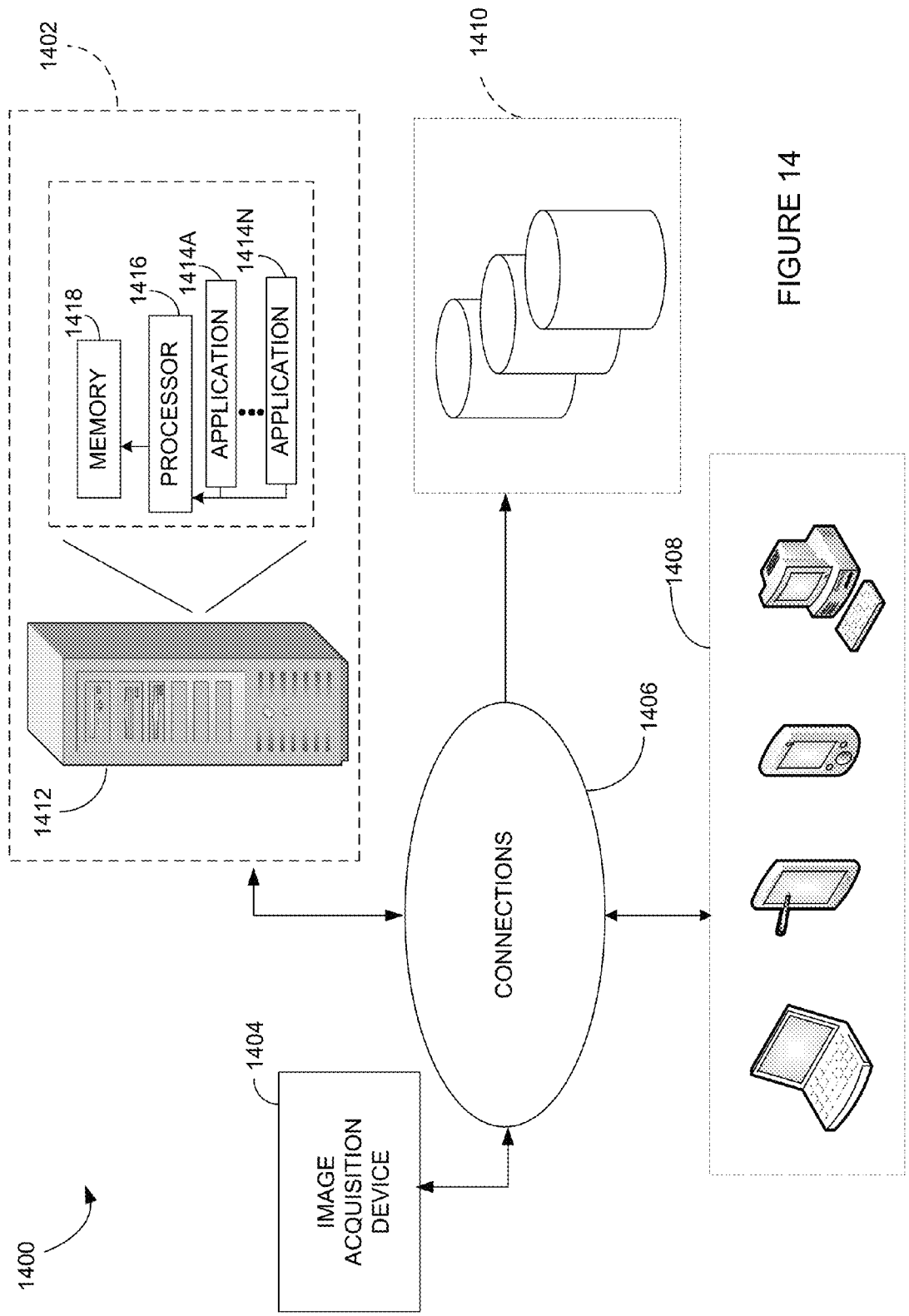
FIG. 14 is a block diagram of a system for image color correction, in accordance with one embodiment.

Referring now to FIG. 14, a system 1400 for correcting color in an image will now be described. In FIG. 14, there is illustrated an image color correction system 1402 operatively connected to an image acquisition device 1404. The image acquisition device 1404 may be provided separately from or incorporated within the image color correction system 1402. For example, the image color correction system 1402 may be integrated with the image acquisition device 1404 either as a downloaded software application, a firmware application, or a combination thereof. The image acquisition device 1404 may be any instrument capable of recording images that can be stored directly, transmitted to another location, or both. The image acquisition device 1404 may consist of a still camera or video camera, for example, and the images may be still images or frames of a video sequence.

Various types of connections 1406 may be provided to allow the image color correction system 1402 to communicate with the image acquisition device 1404. For example, the connections 1406 may comprise wire-based technology, such as electrical wires or cables, and/or optical fibers. The connections 1406 may also be wireless, such as Radio Frequency (RF), infrared, Wi-Fi, Bluetooth, and others. Connections 1406 may therefore comprise a network, such as the Internet, the Public Switch Telephone Network (PSTN), a cellular network, or others known to those skilled in the art. Communication over the network may occur using any known communication protocols that enable devices within a computer network to exchange information. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol).

The image color correction system 1402 may be accessible remotely from any one of a plurality of devices 1408 over the connections 1406. The devices 1408 may comprise any device, such as a personal computer, a tablet, a smart phone, or the like, which is configured to communicate over the connections 1406. In some embodiments, the image color correction system 1402 may itself be provided directly on one of the devices 1408, either as a downloaded software application, a firmware application, or a combination thereof. Similarly, the image acquisition device 1404 may be integrated with one of the devices 1408. In some embodiments, the image acquisition device 1404 and the image color correction system 1402 are both provided directly on one of devices 1408, either as a downloaded software application, a firmware application, or a combination thereof.

One or more databases 1410 may be integrated directly into the image color correction system 1402 or any one of the devices 1408, or may be provided separately therefrom (as illustrated). In the case of a remote access to the databases 1410, access may occur via connections 1406 taking the form of any type of network, as indicated above. The various databases 1410 described herein may be provided as collections of data or information organized for rapid search and retrieval by a computer. The databases 1410 may be structured to facilitate storage, retrieval, modification, and deletion of data in conjunction with various data-processing operations. The databases 1410 may be any organization of data on a data storage medium, such as one or more servers. As discussed herein above, in some embodiments, a computed color mapping function may be stored in the databases 1410 during a pre-processing stage and then retrieved from the databases 1410 for performing, during an execution stage, image color correction on images acquired by the image acquisition device 1404. Also, the image(s) to be corrected may be received directly from the image acquisition device 1404 or retrieved from the databases 1410. Moreover, the one or more reference color statistics used to compute the color mapping function may be provided directly by a user or retrieved from the databases 1410.

As shown in FIG. 14, the image color correction system 1402 illustratively comprises one or more server(s) 1412. For example, a series of servers corresponding to a web server, an application server, and a database server may be used. These servers are all represented by server 1412 in FIG. 14. The server 1412 may be accessed by a user using one of the devices 1408, or directly on the system 1402 via a graphical user interface. The server 1412 may comprise, amongst other things, a plurality of applications $1414a \ldots 1414n$ running on a processor 1416 coupled to a memory 1418. It should be understood that while the applications $1414a \ldots 1414n$ presented herein are illustrated and described as separate entities, they may be combined or separated in a variety of ways.

The memory 1418 accessible by the processor 1416 may receive and store data. The memory 1418 may be a main memory, such as a high speed Random Access Memory (RAM), or an auxiliary storage unit, such as a hard disk, a floppy disk, or a magnetic tape drive. The memory 1418 may be any other type of memory, such as a Read-Only Memory (ROM), or optical storage media such as a videodisc and a compact disc. The processor 1416 may access the memory 1418 to retrieve data. The processor 1416 may be any device that can perform operations on data. Examples are a central processing unit (CPU), a front-end processor, a microprocessor, and a network processor. The applications $1414a \ldots 1414n$ are coupled to the processor 1416 and configured to perform various tasks. An output may be transmitted to the image acquisition device 1404 and/or to the devices 1408.

Figure 15:
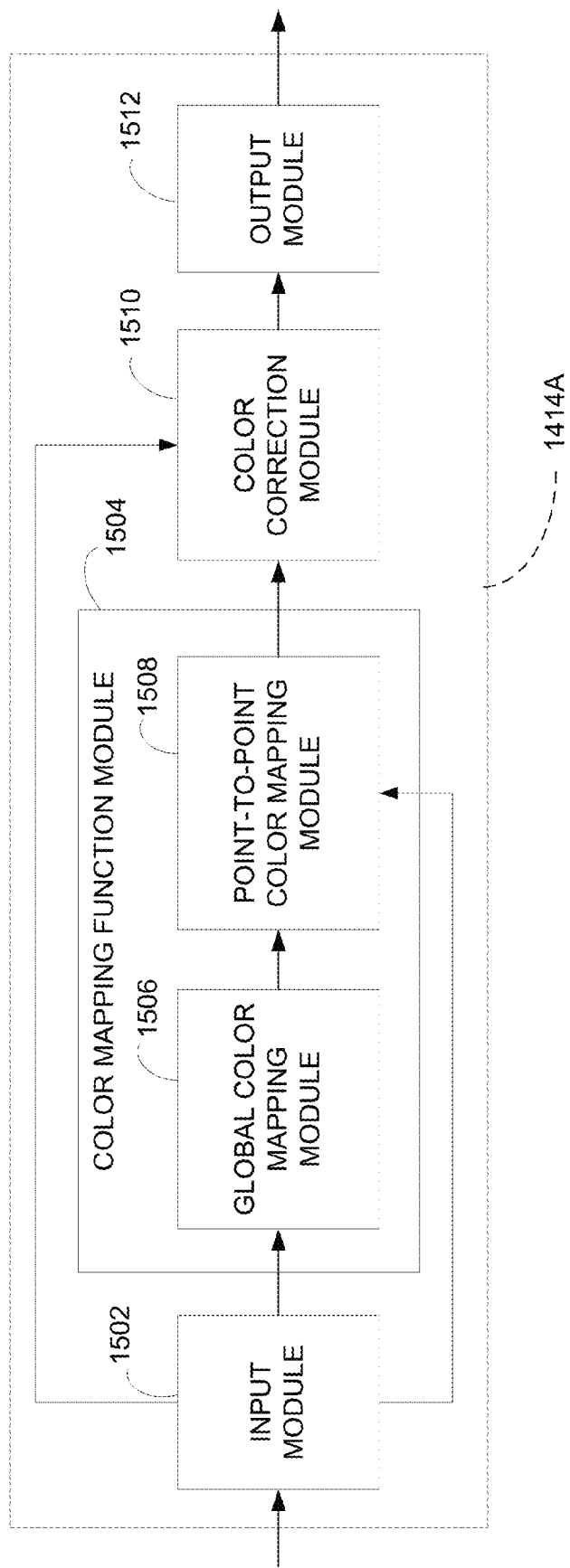
FIG. 15 is a block diagram showing an exemplary application running on the processor of FIG. 14, in accordance with one embodiment.

FIG. 15 illustrates an exemplary embodiment of an application $1414a$ running on the processor 1412. The application $1414a$ illustratively comprises an input module 1502, a color mapping function module 1504 comprising a global color mapping module 1506 and a point-to-point color mapping module 1508, a color correction module 1510, and an output module 1512. During a pre-processing stage, the input module 1502 illustratively receives (e.g. directly from the acquisition device 1404 and/or the devices 1408 or upon retrieval from the memory 1418 and/or databases 1410) an input image sample. One or more reference color statistics may also be received at the input module 1502 (e.g. provided directly by a user via their device 1408). Alternatively, the input module 1502 may receive a reference image, which is sent to the color mapping function module 1504 that will analyze (e.g. extract one or more color-related statistical properties of) the reference image to determine therefrom the one or more reference color statistics. In some embodiments, the reference color statistic(s) may not be received at the input module 1502 but rather retrieved by the color mapping function module 1504 from the memory 1418 and/or databases 1410.

The input module 1502 then sends the input image sample to the color mapping function module 1504. In addition, the input module 1502 may send to the color mapping function module 1504 the one or more reference color statistic(s) if the latter are received directly at the input module 1502. In embodiments where a reference image (rather than the one or more reference color statistic(s)) is received at the input module 1502, the latter is sent to the color mapping function module 1504. The color mapping function module 1504 then computes a color mapping function accordingly. For this purpose, the input image sample and the one or more reference color statistic(s) (received directly from the input module 1502, determined from the reference image received from the input module 1502, or retrieved from the memory 1418 and/or databases 1410) are first received at the global color mapping module 1506. The global color mapping module 1506 then performs a global color mapping between the input image sample and the one or more reference color statistics to obtain a globally-mapped input image sample. The global color mapping is illustratively performed in the manner discussed above with reference to FIG. 5 and FIGS. 6A-6C. In one embodiment, the global color mapping is performed by the global color mapping module 1506 in accordance with the methods discussed above with reference to FIG. 10 and FIG. 11.

The global color mapping module 1506 sends the globally-mapped input image sample to the point-to-point color mapping module 1508, which may also receive the input image sample from the input module 1502. It should be understood that the input image sample may alternatively be provided to the point-to-point color mapping module 1508 by the global color mapping module 1506. The point-to-point color mapping module 1508 performs a point-to-point color mapping to compute a color mapping function between the input image sample and the globally-mapped input image sample. As discussed above, the point-to-point color mapping module 1508 finds a color mapping function that minimizes an error between the color-corrected color values of the input image sample transformed according to the color mapping function and the color values at corresponding pixel locations in the globally-mapped input image sample, and this, over the set of pixel locations. This may be achieved using the methods described above with reference to FIG. 7 and FIGS. 8A-8B. In one embodiment, the point-to-point color mapping is performed in accordance with the methods discussed above with reference to FIG. 12. The computed color mapping function may then be output to the color correction module 1510. The computed color mapping function may also be sent to the memory 1418 and/or databases 1410 for storage therein.

During an execution stage, the input module 1502 receives one or more input images to be corrected. As discussed above, the input image(s) may be received from the acquisition device 1404 and/or the devices 1408 or retrieved from the memory 1418 and/or databases 1410. The color correction module 1510 then performs image color correction by applying the computed color mapping function to each received input image to generate a color-corrected image for each input image. For this purpose, the color correction module 1510 may apply the color mapping function received from the color mapping function module 1504. Alternatively, the color correction module 1510 may retrieve the color mapping function from the memory 1418 and/or databases 1410 for application to the input images. In one embodiment, the color correction module 1510 generates the color-corrected image(s) in accordance with the methods discussed above with reference to FIG. 13. The color-corrected image(s) generated by the color correction module 1510 are then sent to the output module 1512 where they may be formatted for transmission to the devices 1408 using any suitable communication means discussed above. The output module 1512 may also format the color-corrected image(s) for rendering on an output device (not shown), such as a screen or display, provided with the devices 1408.

Other variants to the configurations of the input module 1502, color mapping function module 1504, color correction module 1510, and output module 1512 may also be provided and the example illustrated is simply for illustrative purposes.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims.

Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A method for image color correction performed by a processor, the method comprising:
   receiving at least one reference value for at least one color statistic;
   receiving an input image sample;
   performing a global color mapping between the input image sample and the at least one reference value to obtain a globally-mapped input image sample, the at least one color statistic of the globally-mapped input image sample substantially matching the at least one reference value and each pixel location in the globally-mapped input image sample having a correspondence with a corresponding pixel location in the input image sample;
   computing a point-to-point color mapping function minimizing for all pixels an error between the globally-mapped input image sample and the input image sample mapped according to the color mapping function, the color mapping function transforming at least one color value of each pixel location in the input image sample to substantially match at least one color value of the corresponding pixel location in the globally-mapped input image sample; and performing image color correction on at least one input image using the color mapping function.

2. The method of claim 1, wherein performing image color correction comprises:
receiving the at least one input images for correction;
applying the color mapping function to each of the at least one input images, thereby forming one or more color corrected images; and
outputting the one or more color corrected images.

3. The method of claim 1, wherein receiving the at least one reference value for the at least one color statistic comprises receiving a reference image and analyzing the reference image to determine therefrom the at least one reference value.

4. The method of claim 3, wherein analyzing the reference image to determine therefrom the at least one reference value comprises determining a reference color histogram from the reference image and further wherein performing the global color mapping comprises obtaining the globally-mapped input image sample having a color histogram that substantially matches the reference color histogram.

5. The method of claim 1, wherein receiving the at least one reference value for the at least one color statistic comprises receiving a reference color histogram and further wherein performing the global color mapping comprises obtaining the globally-mapped input image sample having a color histogram that substantially matches the reference color histogram.

6. The method of claim 1, wherein computing the point-to-point color mapping function comprises determining values of parameters of the color mapping function.

7. The method of claim 6, wherein a form of the color mapping function is a polynomial function and further wherein determining the values of parameters of the color mapping function comprises determining values of polynomial coefficients of the polynomial function.

8. The method of claim 7, further comprising selecting terms to include in the polynomial function in accordance with a statistical significance of the terms during data fitting.

9. The method of claim 1, wherein minimizing the error comprises minimizing a square of the error.

10. The method of claim 9, wherein computing the point-to-point color mapping function comprises applying a Pseudo Inverse technique.

11. The method of claim 1, wherein computing the point-to-point color mapping function comprises applying a regularization technique.

12. The method of claim 11, wherein applying the regularization technique comprises applying a Tikhonov regularization.

13. The method of claim 1, wherein the at least one color value comprises one of a grayscale intensity value and a set of color component values.

14. A method for image color correction performed by a processor, the method comprising:
receiving a reference color histogram;
receiving an input image sample;
performing a global color mapping between the input image sample and the reference color histogram to obtain a globally-mapped input image sample, a color histogram of the globally-mapped input image sample substantially matching the reference color histogram and each pixel location in the globally-mapped input image sample having a correspondence with a corresponding pixel location in the input image sample;
applying a Pseudo Inverse technique to compute a point-to-point color mapping function minimizing for all pixels a square error between the globally-mapped input image sample and the input image sample mapped according to the color mapping function, the color mapping function transforming at least one color value of each pixel location in the input image sample to substantially match at least one color value of the corresponding pixel location in the globally-mapped input image sample; and
performing image color correction on at least one input image using the color mapping function.

15. The method of claim 14, wherein the point-to-point color mapping function is a polynomial function and applying a Pseudo Inverse technique to compute the point-to-point color mapping function comprises determining values of polynomial coefficients of the polynomial function and selecting terms to include in the polynomial function in accordance with a statistical significance of the terms during data fitting.

16. The method of claim 14, wherein applying the Pseudo Inverse technique comprises applying a regularization technique.

17. The method of claim 16, wherein applying the regularization technique comprises applying a Tikhonov regularization.

18. A system for image color correction, the system comprising:
a memory;
a processor; and
at least one application stored in the memory and executable by the processor for:
receiving at least one reference value for at least one color statistic;
receiving an input image sample;
performing a global color mapping between the input image sample and the at least one reference value to obtain a globally-mapped input image sample, the at least one color statistic of the globally-mapped input image sample substantially matching the at least one reference value and each pixel location in the globally-mapped input image sample having a correspondence with a corresponding pixel location in the input image sample;
computing a point-to-point color mapping function minimizing for all pixels an error between the globally-mapped input image sample and the input image sample mapped according to the color mapping function, the color mapping function transforming at least one color value of each pixel location in the input image sample to substantially match at least one color value of the corresponding pixel location in the globally-mapped input image sample; and
performing image color correction on at least one input image using the color mapping function.

19. The system of claim 18, wherein the at least one application is executable by the processor for:
receiving one or more input images for correction;
applying the color mapping function to each of the one or more input images, thereby forming one or more color corrected images; and
outputting the one or more color corrected images.

20. The system of claim 18, wherein the at least one application is executable by the processor for receiving a reference image and for analyzing the reference image to determine therefrom the at least one reference value for the at least one color statistic.

21. The system of claim 20, wherein the at least one application is executable by the processor for determining a reference color histogram from the reference image and for performing the global color mapping comprising obtaining the globally-mapped input image sample having a color histogram that substantially matches the reference color histogram.

22. The system of claim 18, wherein the at least one application is executable by the processor for receiving a reference color histogram and for performing the global color mapping comprising obtaining the globally-mapped input image sample having a color histogram that substantially matches the reference color histogram.

23. The system of claim 18, wherein the at least one application is executable by the processor for determining values of parameters of the point-to-point color mapping function.

24. The system of claim 23, wherein the at least one application is executable by the processor for determining the values of parameters of the color mapping function having a form of a polynomial function, comprising determining the values of polynomial coefficients of the polynomial function.

25. The system of claim 24, wherein the at least one application is executable by the processor for selecting terms to include in the polynomial function in accordance with a statistical significance of the terms during data fitting.

26. The system of claim 18, wherein the at least one application is executable by the processor for minimizing a square of the error.

27. The system of claim 26, wherein the at least one application is executable by the processor for applying a Pseudo Inverse technique in computing the point-to-point color mapping function.

28. The system of claim 18, wherein the at least one application is executable by the processor for applying a regularization technique in computing the point-to-point color mapping function.

29. The system of claim 28, wherein the at least one application is executable by the processor for applying a Tikhonov regularization.

30. A non-transitory computer readable medium having stored thereon program code executable by a processor for image color correction, the program code executable for:
   receiving at least one reference value for at least one color statistic;
   receiving an input image sample;
   performing a global color mapping between the input image sample and the at least one reference value to obtain a globally-mapped input image sample, the at least one color statistic of the globally-mapped input image sample substantially matching the at least one reference value and each pixel location in the globally-mapped input image sample having a correspondence with a corresponding pixel location in the input image sample;
   computing a point-to-point color mapping function minimizing for all pixels an error between the globally-mapped input image sample and the input image sample mapped according to the color mapping function, the color mapping function transforming at least one color value of each pixel location in the input image sample to substantially match at least one color value of the corresponding pixel location in the globally-mapped input image sample; and
   performing image color correction on at least one input image using the color mapping function.

* * * * *